(12) United States Patent
Roy (10) Patent No.: US 11,961,009 B2
(45) Date of Patent: Apr. 16, 2024

(54) ARTIFICIAL INTELLIGENCE ALGORITHM ACCESS TO MULTIPLE USERS

(71) Applicant: The Government of the United States, as represented by the Secretary of the Army, Washington, DC (US)

(72) Inventor: Radhika Roy, Howell, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 717 days.

(21) Appl. No.: 17/086,853

(22) Filed: Nov. 2, 2020

(65) Prior Publication Data
US 2023/0252308 A1    Aug. 10, 2023

(51) Int. Cl.
*G06F 21/62*    (2013.01)
*G06F 8/36*    (2018.01)
*G06N 3/02*    (2006.01)
*G06N 5/022*    (2023.01)

(52) U.S. Cl.
CPC ............. *G06N 5/022* (2013.01); *G06F 8/36* (2013.01); *G06F 21/6218* (2013.01); *G06N 3/02* (2013.01); *G06F 2221/2113* (2013.01)

(58) Field of Classification Search
CPC .. G06N 5/022; G06N 3/02; G06F 8/36; G06F 21/6218; G06F 2221/2113; G06F 21/62; G06F 2221/21
See application file for complete search history.

(56) References Cited

U.S. PATENT DOCUMENTS

| | | | |
|---|---|---|---|
| 9,197,665 B1 * | 11/2015 | Cabot | G06F 11/00 |
| 11,080,556 B1 * | 8/2021 | Gillian | G06F 18/25 |
| 2018/0082212 A1 * | 3/2018 | Faivishevsky | G06N 5/01 |
| 2020/0145816 A1 * | 5/2020 | Morin | H04W 56/001 |
| 2021/0117893 A1 * | 4/2021 | Sohum | G06Q 30/0613 |

* cited by examiner

*Primary Examiner* — Quazi Farooqui
(74) *Attorney, Agent, or Firm* — Ronald Krosky (57) ABSTRACT

Various embodiments that pertain to artificial intelligence algorithms. A repository can retain a reusable common set of artificial intelligence algorithms. Different users can access this common set of artificial intelligence algorithms and employ individual artificial intelligence algorithms in programs as appropriately as they are developing different applications and/or products. Employment of these individual artificial intelligence algorithms can include, for example, tailoring parameters based on the desires of the individual user's desires using the same common set of algorithms or individually or as a group as appropriate.

18 Claims, 10 Drawing Sheets

ARTIFICIAL INTELLIGENCE ALGORITHM ACCESS TO MULTIPLE USERS

GOVERNMENT INTEREST

The innovation described herein may be manufactured, used, imported, sold, and licensed by or for the Government of the United States of America without the payment of any royalty thereon or therefor.

BACKGROUND

In a programing environment, a developer can create an algorithm to achieve a result with a computer program. A more complex program can rely on multiple algorithms to achieve the result. However, the more algorithms the developer has to write, the more time intensive development can be.

Additionally, the complexity of the algorithms can be a factor in how long program development takes. The more complex the algorithm, the longer it can take to write. Further, when similar programs are being developed, developers can concurrently be developing essentially the same algorithms, leading to a waste of organizational resources.

SUMMARY

In one embodiment, a system comprises a first access component and a second access component. The first access component can be configured to grant a first user access to a first artificial intelligence algorithm from an artificial intelligence algorithm repository. The second access component can be configured to grant a second user access to the first artificial intelligence algorithm from the artificial intelligence algorithm repository, where the first user is different from the second user. The artificial intelligence algorithm repository can comprise the first artificial intelligence algorithm and a second artificial intelligence algorithm, where the first artificial intelligence algorithm is different from second artificial intelligence algorithm. The first access component, the second access component, or a combination thereof can be implemented, at least in part, by way of non-software.

In another embodiment, a system comprises a repository and an access portal. The repository can be configured to retain a first artificial intelligence algorithm and a second artificial intelligence algorithm. The access portal can be configured to grant access to multiple users to the first artificial intelligence algorithm and the second artificial intelligence algorithm.

In yet another embodiment, a system can comprise a first access component configured to grant a first user remote access to a first artificial intelligence algorithm from an artificial intelligence algorithm repository. The system can also comprise a second access component configured to grant a second user remote access to the first artificial intelligence algorithm from the artificial intelligence algorithm repository, where the first user is different from the second user. The artificial intelligence algorithm repository can comprise the first artificial intelligence algorithm and a second artificial intelligence algorithm, where the first artificial intelligence algorithm is different from second artificial intelligence algorithm. The first artificial intelligence algorithm can comprise a modifiable parameter set, where the first access component can be configured to grant the first user access to modify the modifiable parameter set in a first manner and the second access component can be configured to grant the second user access to modify the modifiable parameter set in a second manner with the first manner and the second manner being different. The first artificial intelligence algorithm can be a neural network platform algorithm/application layer algorithm and the first access component, the second access component, or a combination thereof can be implemented, at least in part, by way of hardware.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

A central repository can retain various artificial intelligence algorithms. Different users can access these algorithms remotely from the repository. The artificial intelligence algorithms can be a neural network platform algorithm/application layer algorithm. Example algorithms can include machine learning algorithms, deep learning algorithms, cybersecurity algorithms, expandable artificial intelligence algorithms, and casual interface with reflection algorithms.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 1:
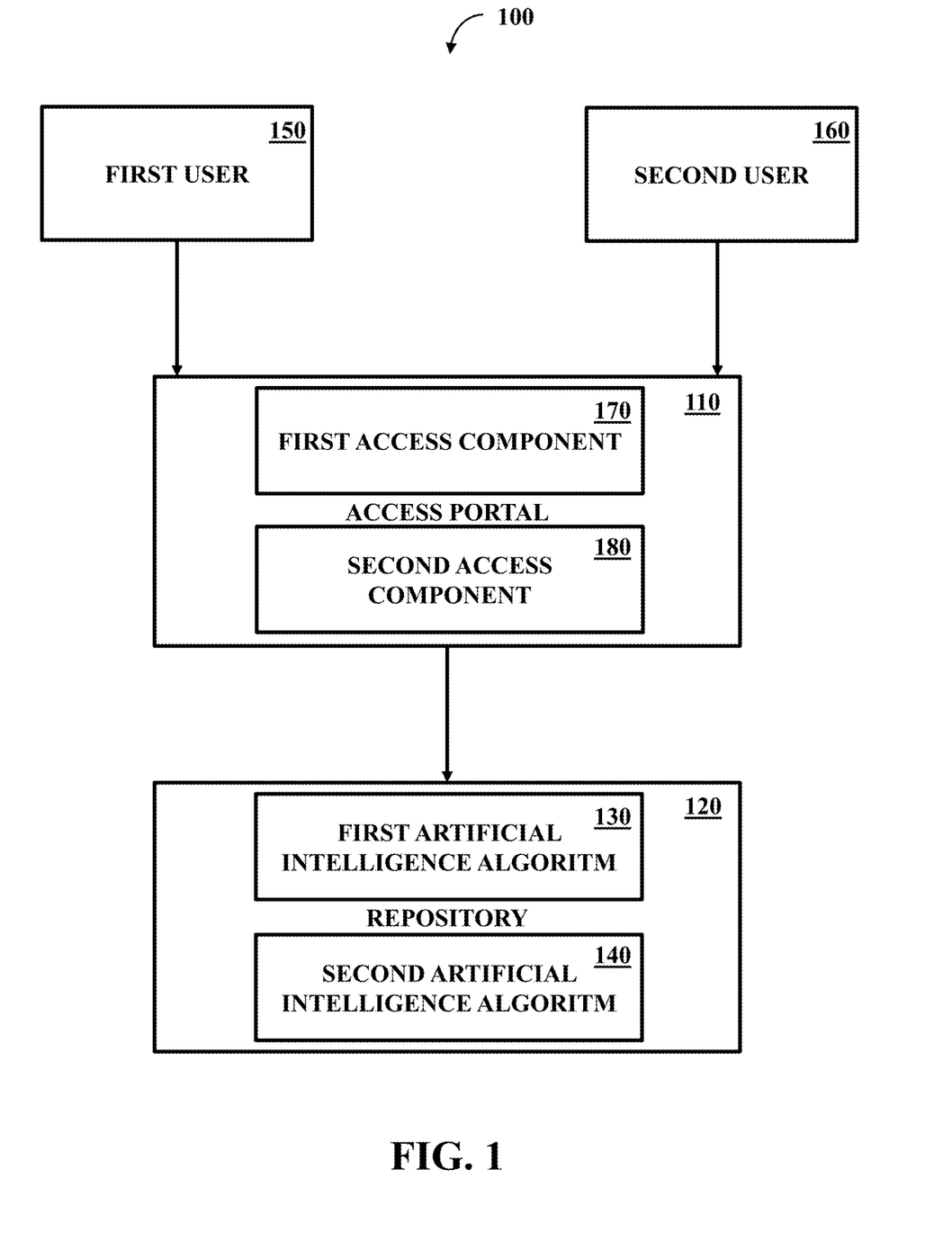
FIG. 1 illustrates one embodiment of an environment comprising an access portal and a repository.

FIG. 1 illustrates one embodiment of an environment comprising an access portal 110 and a repository 120. The repository 120 can retain a first artificial intelligence algorithm 150 and a second artificial intelligence algorithm 140. The access portal 110 can be configured to grant access to multiple users, such as the first user 150 and the second user 160 that are different from one another, to the first artificial intelligence algorithm 130 and the second artificial intelligence algorithm 140.

In one embodiment, the access portal 110 can be a system that comprises a first access portal 170 and a second access portal 180. The first access component 170 can be configured to grant the first user 150 access to the first artificial intelligence algorithm 130 from the repository 120 (e.g., an artificial intelligence algorithm repository). The second access component 180 can be configured to grant the second user 160 access to the first artificial intelligence algorithm 130 from the repository, When developers write programs, they can oftentimes use algorithms. In one example, the first user 150 is a first developer at a first network node and the second user 160 is a second developer at a second network node. The first developer can develop a first program and the second developer can develop a second program. While the programs can be different, they programs can employ common algorithms. While each developer can individually write the same algorithm, this can be redundant and wasteful of resources.

Therefore, the repository 120 can retain a pool of algorithms and the developers can access these algorithms. As opposed to everyone writing their own algorithm, they can use the same algorithm to save time and be more efficient. Various algorithms can be retained by the repository, such as the first artificial intelligence algorithm 130 being a machine learning algorithm, a deep learning algorithm, a cybersecurity algorithm, an expandable artificial intelligence algorithm, or a casual interface with reflection algorithm. In addition to there being different types of algorithms, the algorithms can be at different layers such as a neural network platform layer algorithm or an applications layer algorithm.

Figure 2:
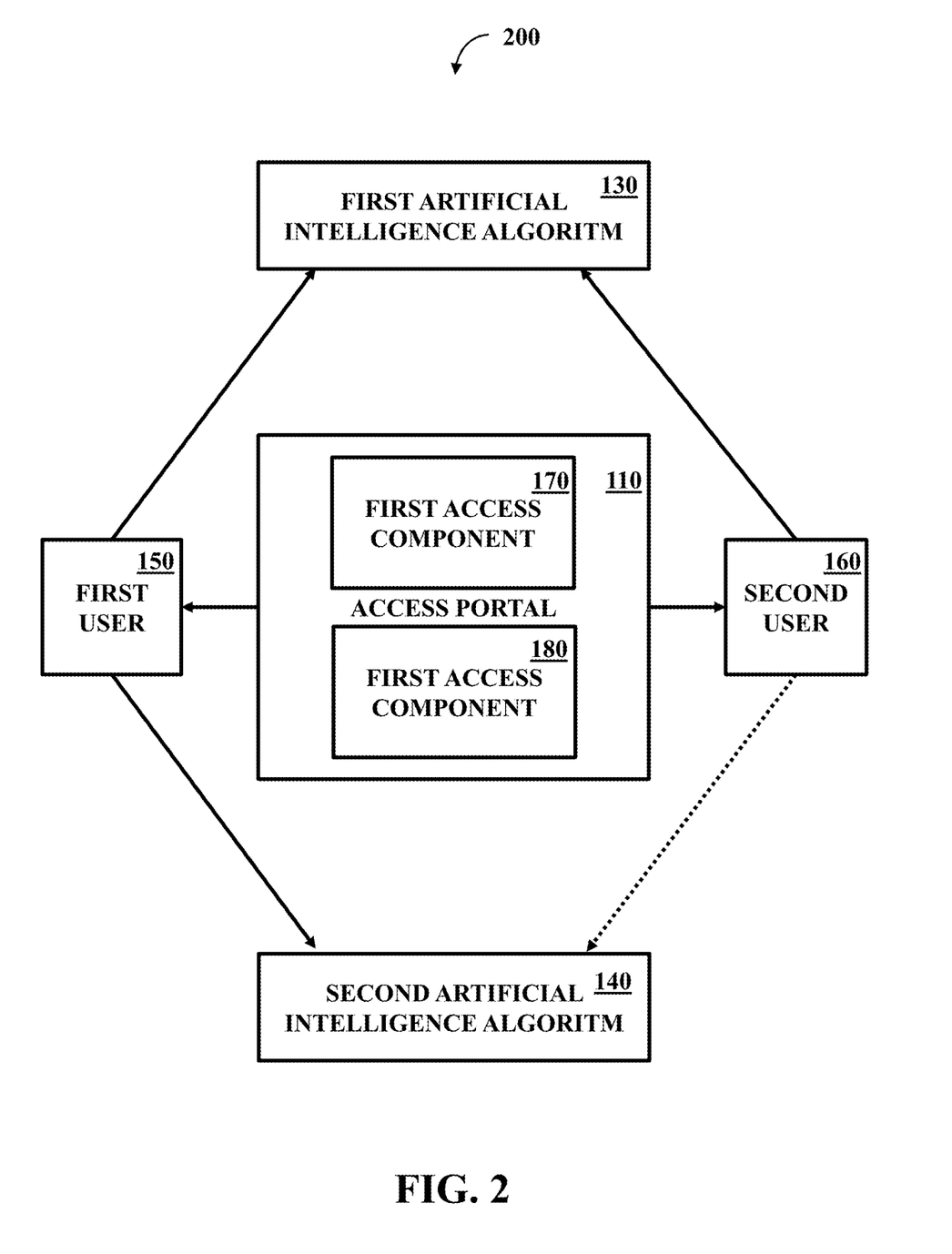
FIG. 2 illustrates one embodiment of an access scheme for the first user and the second user.

FIG. 2 illustrates one embodiment of an access scheme 200 for the first user 150 and the second user 160. In a complex network, different users can have different access levels, such as the first user 150 being able to access higher level of information than the second user. In one example, if an algorithm is ever used in a classified system, then the algorithm can be deemed classified; the first user 150 can have access to classified and unclassified algorithms while the second user 160 can have access to unclassified algorithms without access to classified algorithms.

For the access scheme 200, the first artificial intelligence algorithm 130 can be unclassified while the second artificial intelligence algorithm 140 can be classified. The first access component 170 can manage access for the first user 150 and be configured to grant the first user 150 access to the second artificial intelligence algorithm 140 concurrent with the access to the first artificial intelligence algorithm 130. Meanwhile, the second access component 180 can manage access for the second user 160 and be configured to grant a second user 160 access to the first artificial intelligence algorithm 130 without concurrent access to the second artificial intelligence algorithm 140 (the lack of access represented by the dashed line).

While illustrated as two artificial intelligence algorithms 130 and 140 and two users 150 and 160, it is to be appreciated by one of ordinary skill in the art that the implementation can be far more complex and intricate. The first access component 170 can be configured to grant the first user 150 access to multiple different artificial intelligence algorithms, including the first artificial intelligence algorithm 130, simultaneously from the repository 120. The second access component 180 can be configured to grant the second user 160 access to the same set of multiple different artificial intelligence algorithms as the first user 150, a different set of multiple different artificial intelligence algorithms with at least some overlap the set of the first user 150, or other configurations.

Figure 3:
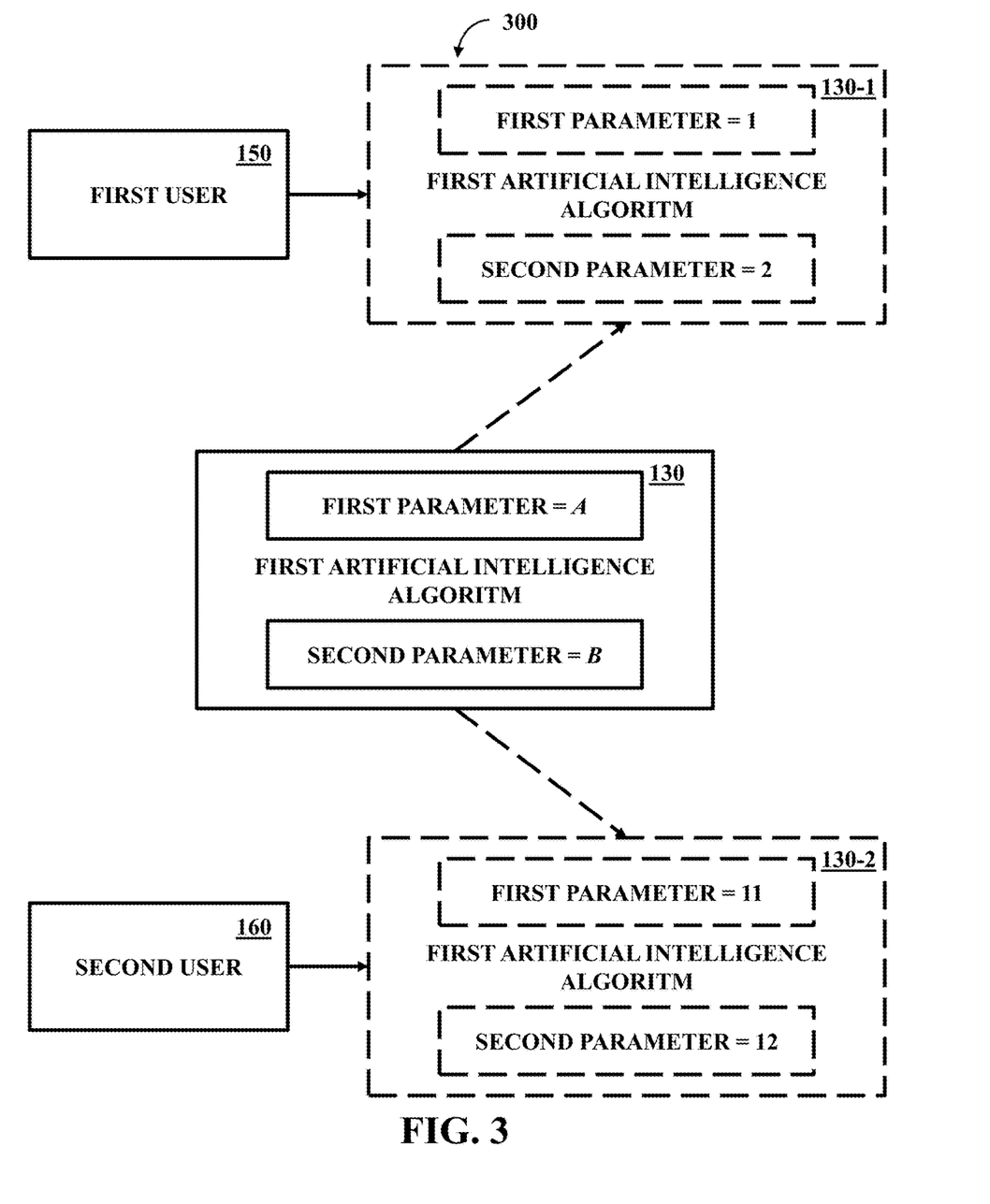
FIG. 3 illustrates one embodiment of a double implementation of the first artificial intelligence algorithm.

FIG. 3 illustrates one embodiment of a double implementation 300 of the first artificial intelligence algorithm 150. Algorithms retained in the repository 120 of FIG. 1, including the first artificial intelligence algorithm 150, can comprise a modifiable parameter set. The parameters of the modifiable parameter set can be adjustable by a user to make the first artificial intelligence algorithm 150 more useful in a program being developed. The first access component 170 of FIG. 1 can be configured to grant the first user 150 access to modify the modifiable parameter set in a first manner. The second access component 180 of FIG. 1 can be configured to grant the second user 160 access to modify the modifiable parameter set in a second manner different from the first manner.

In one example, the modifiable parameter set can comprise a first parameter with an open value of A and a second parameter with an open value of B. The first user 150 can download a first local version 130-1 of the first artificial intelligence algorithm 130. The first user 150 can give the first parameter an actual value of 1 and the second parameter an actual value of 2. Similarly, the second user 160 can download a second local version 130-2 of the first artificial intelligence algorithm 130. The second user 160 can give the first parameter an actual value of 11 and the second parameter an actual value of 12.

Figure 4:
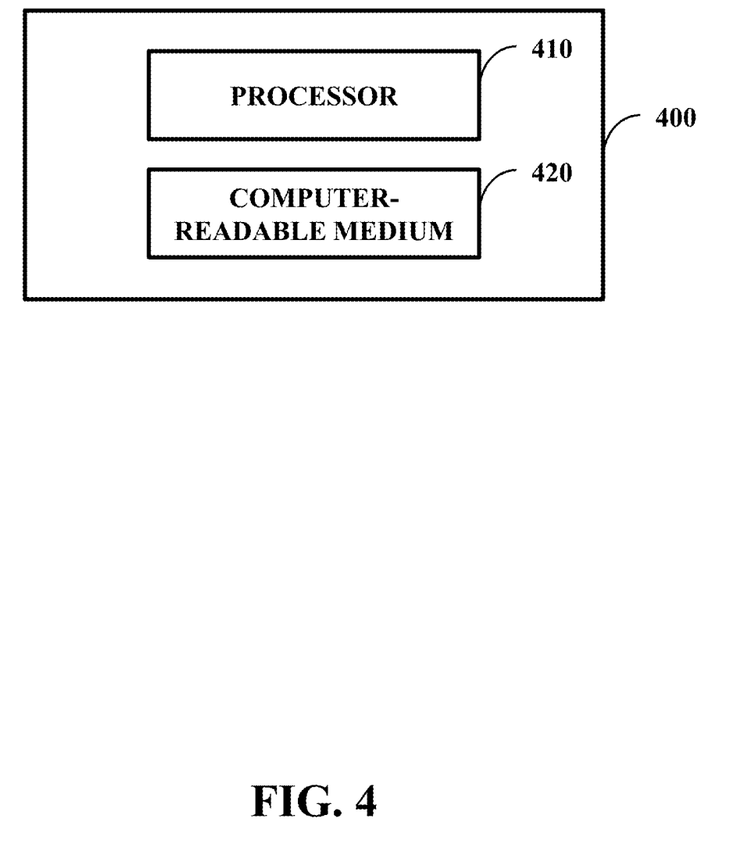
FIG. 4 illustrates one embodiment of a system comprising a processor and a computer-readable medium.

FIG. 4 illustrates one embodiment of a system 400 comprising a processor 410 and a computer-readable medium 420 (e.g., non-transitory computer-readable medium). In one embodiment, the computer-readable medium 420 is communicatively coupled to the processor 410 and stores a command set executable by the processor 210 to facilitate operation of at least one component disclosed herein (e.g., the first access component 130 of FIG. 1). In one embodiment, at least one component disclosed herein (e.g., the second access component 140 of FIG. 1) can be implemented, at least in part, by way of non-software, such as implemented as hardware by way of the system 200. In one embodiment, the computer-readable medium 220 is configured to store processor-executable instructions that when executed by the processor 210, cause the processor 210 to perform at least part of a method disclosed herein (e.g., at least part of one of the methods 500-800 discussed below).

Figure 5:
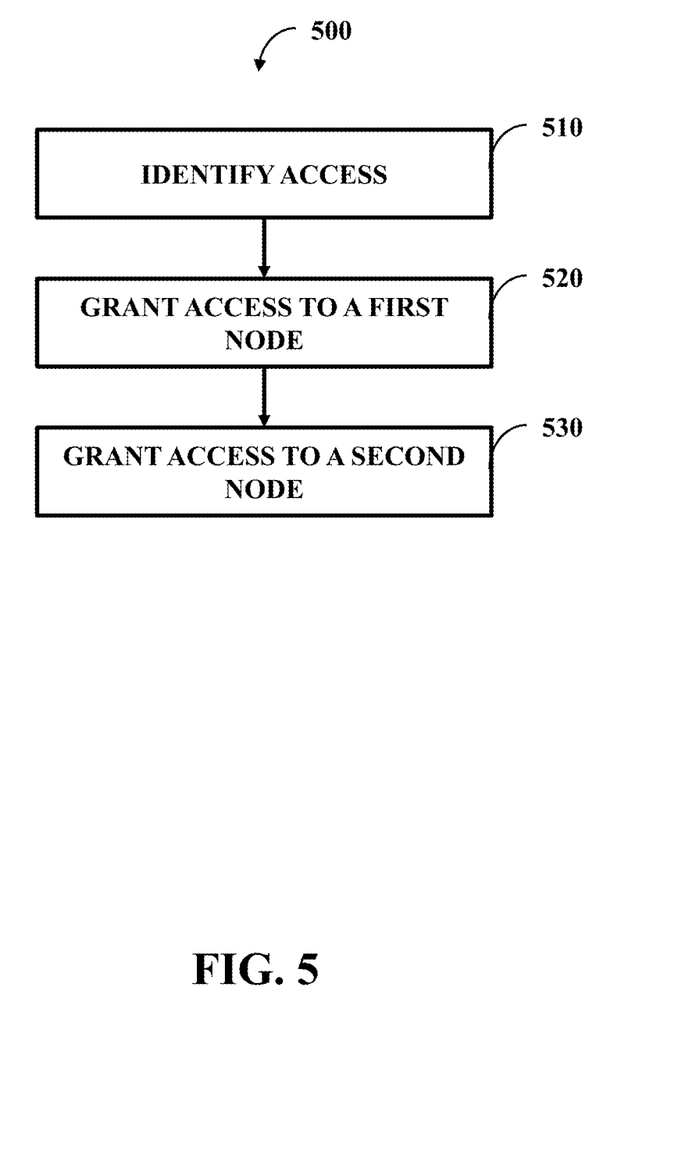
FIG. 5 illustrates one embodiment of a method comprising three actions.

FIG. 5 illustrates one embodiment of a method 500 comprising three actions 510-530. At 510, the access portal 110 of FIG. 1 can identify access to grant. At 520, the access portal 110 of FIG. 1 can grant access to a first node and, at 530, grant access to a second node. These accesses can be different for the different nodes.

In one example, the first node can be a remote work station in a combat zone and the second node can be a remote work station in a home nation. Due to the location of the first node, the access can be more limited while the second node can have greater access due to its location. At 510, the access portal 110 of FIG. 1 can determine a physical location for the nodes and based on this determination it can grant different access levels at 520 and 530.

Figure 6:
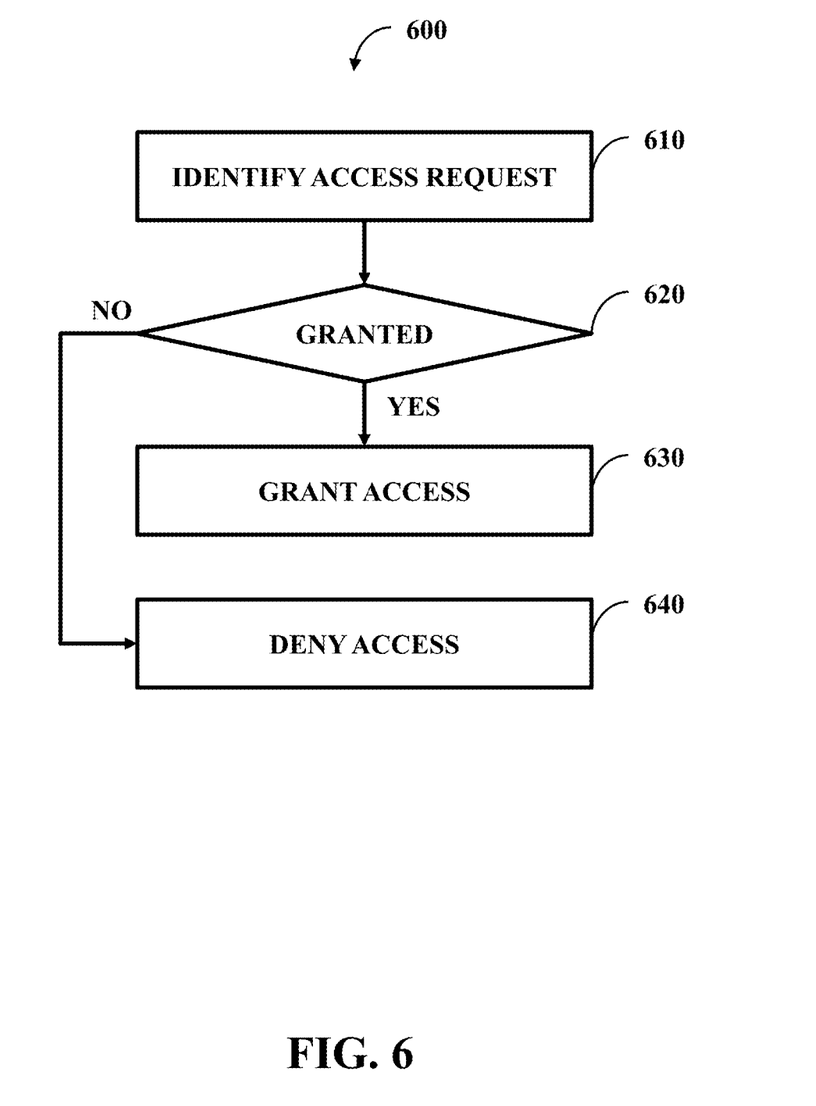
FIG. 6 illustrates one embodiment of a method comprising four actions.

FIG. 6 illustrates one embodiment of a method 600 comprising four actions 610-640. Access granting can be proactive and/or organic; at 610, a network user can request access to an algorithm, such as the first artificial intelligence algorithm 130 of FIG. 1. At 620 a check can occur if the access being requested should be granted. If the access should be granted, then the method 600 can move to 630 to grant the access; if the access should not be granted, then the method 600 can move to 640 to deny the access.

Figure 7:
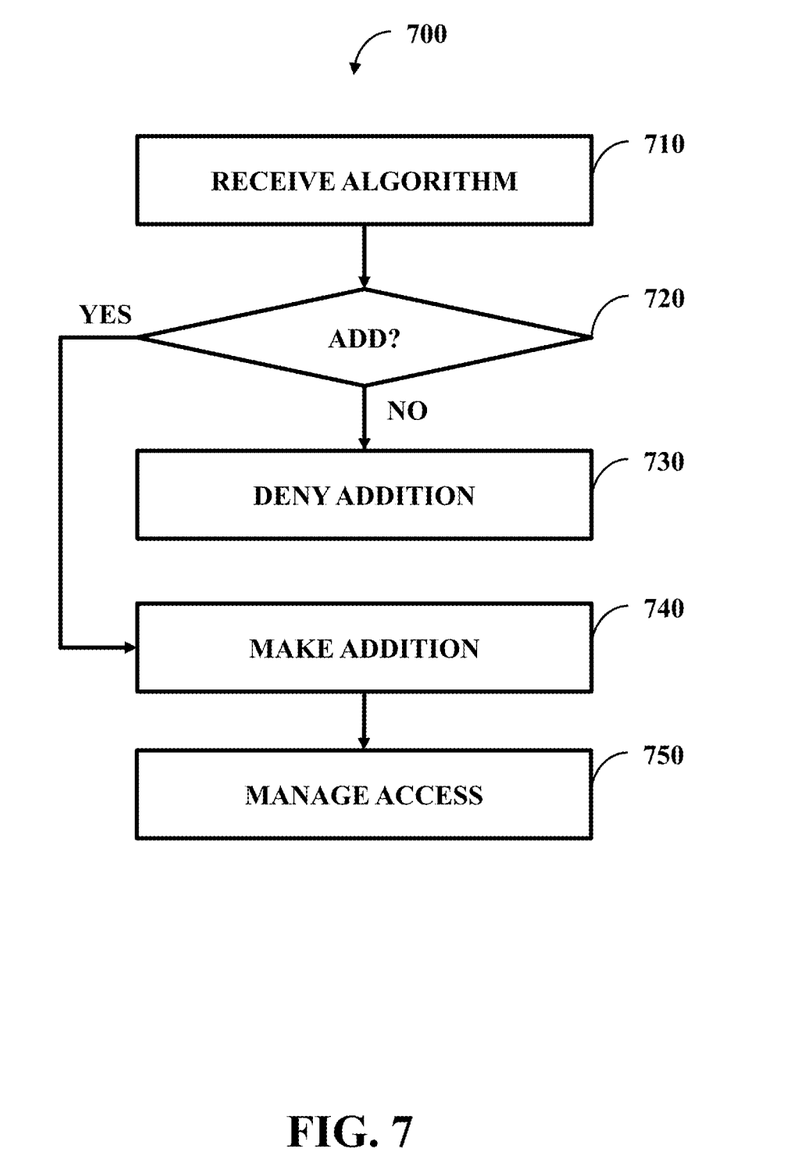
FIG. 7 illustrates one embodiment of a method comprising five actions.

FIG. 7 illustrates one embodiment of a method 700 comprising five actions 710-750. A user may want an algorithm not available in the repository 120 of FIG. 1. The method 700 can be to add an algorithm to the repository 120 of FIG. 1, such as a third artificial intelligence algorithm.

A user can develop the third artificial intelligence algorithm and at 710 the repository 120 of FIG. 1 can receive the algorithm. A component of the repository 120 of FIG. 1 can perform a check 720 to determine if the algorithm should be added. In one embodiment, this check 720 includes determining a source of the third artificial intelligence algorithm to make sure it is submitted by a party authorized to add to the repository 120 of FIG. 1 as well as determining if the repository 120 of FIG. 1 is the appropriate holding place for the algorithm. If addition should not occur, then the repository's component can transferred to the appropriate holding place and/or a rejection notice can be sent to the user along with deny the actual addition at 730.

If the check 720 determines that the third artificial intelligence algorithm should be added, then at 740 the addition can be made. Part of this addition can include categorizing the third artificial intelligence algorithm, adding metadata to make it identifiable to other users, and determining access for the third artificial intelligence algorithm. At 750, access to the third artificial intelligence algorithm can be managed (e.g., by the access portal 110 of FIG. 1 in accordance with the method 600 of FIG. 6). The third artificial intelligence algorithm, as well as other algorithms disclosed herein, can be a neural network platform algorithm/application layer algorithm (a neural network platform algorithm or an application layer algorithm).

Figure 8:
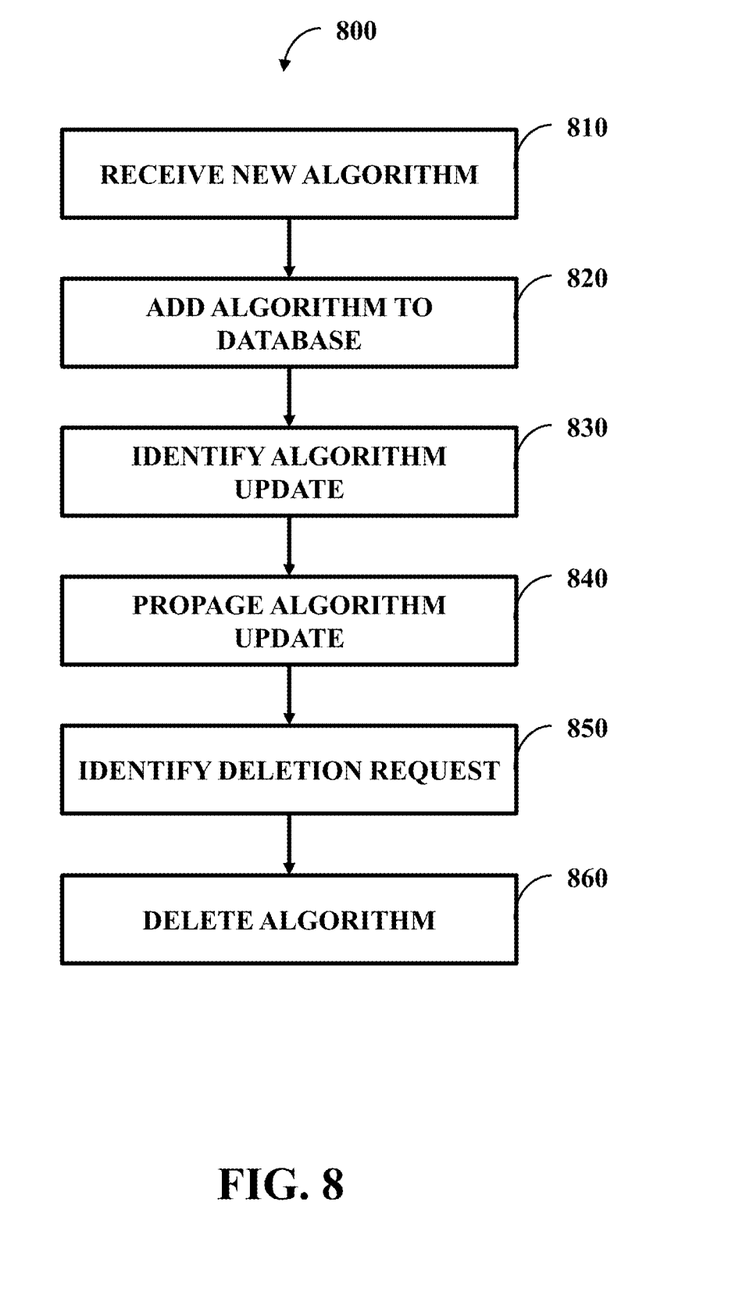
FIG. 8 illustrates one embodiment of a method comprising six actions.

FIG. 8 illustrates one embodiment of a method 800 comprising six actions 810-860. At 810 a new algorithm can be received, such as a fourth artificial intelligence algorithm and at 820 the fourth artificial intelligence algorithm can be added to the repository 120 of FIG. 1 (e.g., after running through method 700 of FIG. 7).

The fourth artificial intelligence algorithm can be subjected to an update. In one example, a force operates multiple repositories worldwide and a central manager determines that the fourth artificial intelligence algorithm has an error, so should be updated. At 830, the update can be collected and identified by the repository's component. At 840 the update can be propagated so the fourth artificial intelligence algorithm is updated (e.g., after the update is evaluated in a manner similar to the check 720 of FIG. 7).

At some point, a decision can be made to delete the fourth artificial intelligence algorithm (e.g., delete and replace as part of an update or completely delete). In one example, the fourth artificial intelligence algorithm can become obsolete due to a fifth artificial intelligence algorithm that achieves the same result more quickly and the central manger can delete the fourth artificial intelligence algorithm so developers no longer use it. At 850 a deletion request can be identified (e.g., evaluated in a manner similar to the check 720 of FIG. 7) and, at 860, deletion can occur (e.g., in response to a determination that deletion should occur).

While the methods disclosed herein are shown and described as a series of blocks, it is to be appreciated by one of ordinary skill in the art that the methods are not restricted by the order of the blocks, as some blocks can take place in different orders.

Figure 9A:
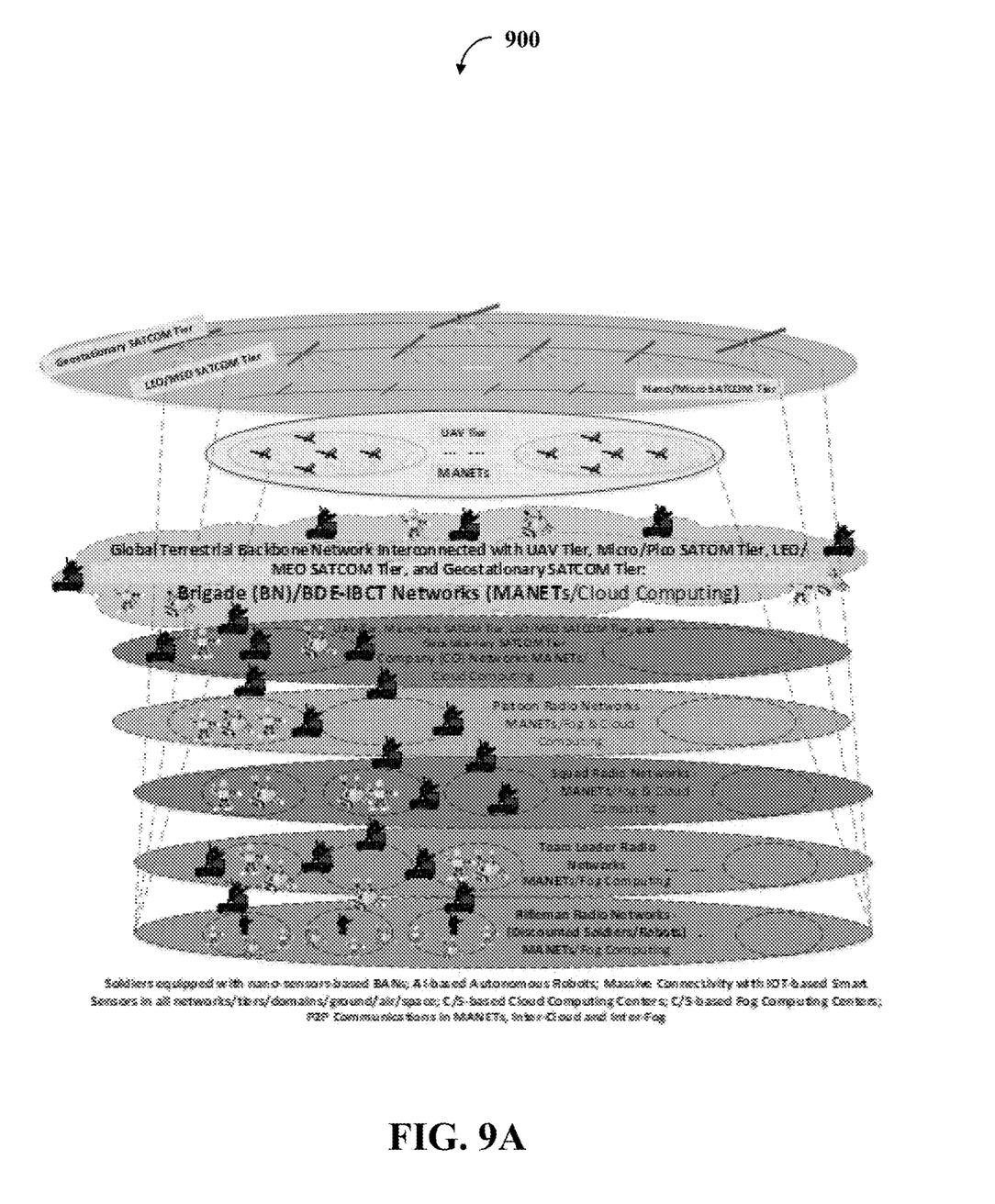
FIG. 9A illustrates one embodiment of a network architecture.
Figure 9B:
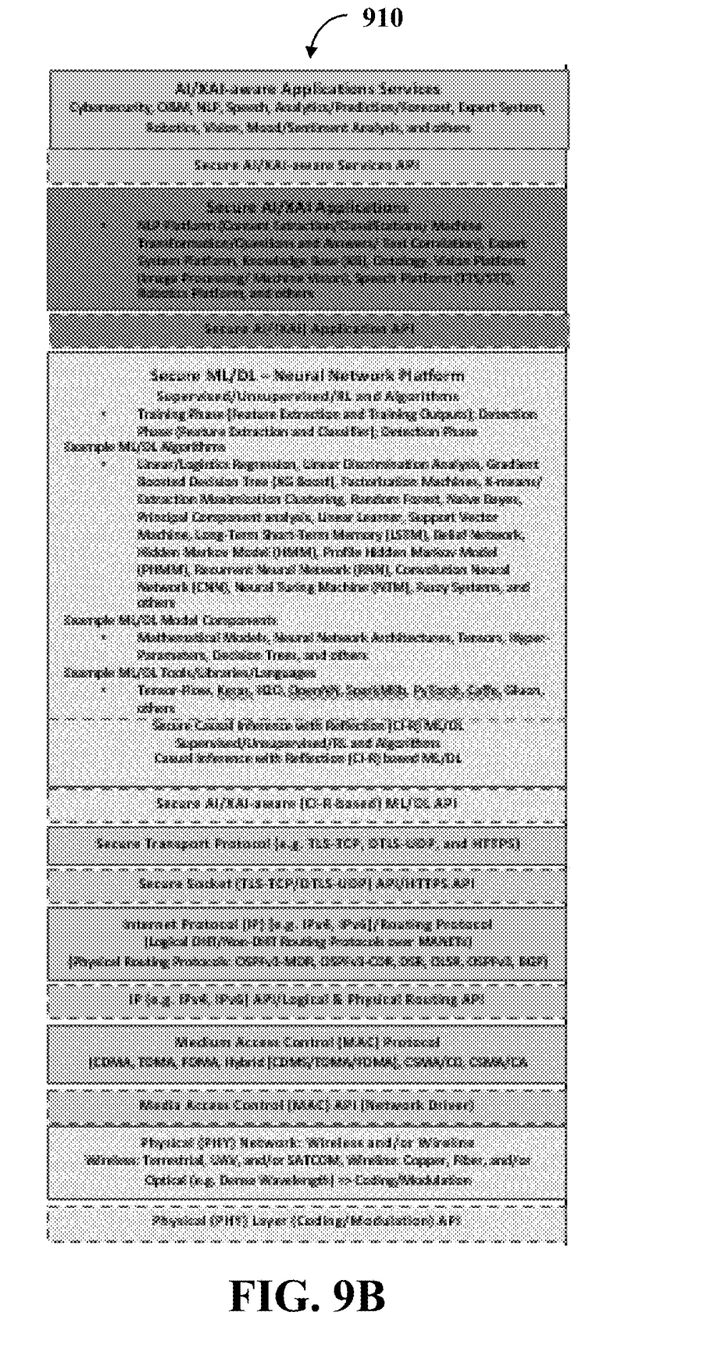
FIG. 9B illustrates one embodiment of a cybersecurity architecture framework.

FIG. 9A illustrates one embodiment of a network architecture 900 and FIG. 9B illustrates one embodiment of a cybersecurity architecture framework 910. Big-data processing in security analysis can occur for both wireless and non-wireless networks. In view of this, an artificial intelligence (AI), including machine learning (ML)/deep learning (DL), based (referred to as AI/ML/DL-based) warfighter cybersecurity architecture framework can be employed. A vast amount of inputs from multiple sources can be correlated by warfighters for decision making in real-time for cybersecurity. It can be beneficial that cybersecurity uses automation and speed for detection, prevention, and recovery from malware/cyberattacks. An AI/ML/DL-based cybersecurity architecture can reduce the information overload for warfighters in securing the network and devices in mobile wireless networks that have serious bandwidth and performance constraints. A common technology-agnostic AI/ML/DL-based architecture framework and its application programming interfaces (APIs) can foster interoperability and scalability in multi-vendor environments not only for cybersecurity but for also for individual Open Standard International (OSI) layers from the physical, link/MAC, network, transport, middleware to application for both a warfighter and a commercial network.

The processing and handling of high-volume data for security analysis can cause serious information overload for warfighters in both wireless and non-wireless network. The situation becomes more problematic when the big-data is to be handled in mobile combat situations. Advances in artificial intelligence (AI), along with machine learning (ML)/deep machine learning (DL) have made it possible to use these technologies for detection, prevention, response, and recovery against malware/cyberattacks even in ad hoc mobile networks (MANETs) that have serious bandwidth and performance constraints. The cybersecurity analysis becomes more complicated for warfighter networks that comprise manned and unmanned ground MANETs, mobile cellular networks, unmanned aerial vehicle (UAV) networks, mobile and geostationary satellite networks, and terrestrial networks spanning across the globe. On the other hand, AI/ML/DL can be a beneficial mechanism for extracting information of big data from sensors and databases distributed across the global network. The big data models for ultra-high-dimensional problems can put tremendous pressure on AI/ML/DL methods to scale beyond a single machine, due to both space and time bottlenecks. It can be difficult to instantly communicate cyber threats, patterns, and attacks as well as detected threats in real-time without the use of AI/MLL/DL capabilities. To achieve this, a framework for AI/ML/DL-based Cybersecurity of Warfighter Network Architecture can be employed.

Cyber-attacks are a key concern in the public Internet, Military Networks, Commercial Networks, etc. The AI/ML/DL-based cybersecurity can help in automating the processing of huge databases such as searching through log files for signs of compromises, detecting behavioral anomalies to find attackers on the inside or logged in with stolen credentials. Although commercial enterprise users have access to multi-mega/gigabit bandwidth connections, the military tactical network can at times operate with disconnected, intermittent, limited bandwidth (DTL) connections (e.g. MANETs) especially in mobile, dismounted combat situations.

A technology-agnostic common AI/ML/DL-based architecture framework can be employed that is equally used by both cybersecurity and non-security related applications fostering interoperability and economies-of-scale in multi-vendor environments for various networks, including military and commercial. Features and datasets of algorithms used for security and non-security applications can be definitely be different. Similarly, features and datasets of algorithms used by bandwidth- and performance-constraints warfighter networks can also fundamentally be different than those of the commercial networks, but can use the same architectural framework. The cybersecurity architecture framework 910 illustrates how different developers can choose algorithms in accordance their needs, but they can use the same technology-agnostic common architecture.

In addition, the cybersecurity itself can use the AI/ML/DL infrastructure for automation and faster processing of information near-real-time because it is an intractable and time-intensive task to specify a set of rule-based policies, processing of log-data, and analyzing on-going traffic flows for conceivable scenarios of each application using classical legacy security tools. A huge challenge is how to understand every possible content, their application behavior, and target environments. Another challenge is how to deploy diverse changeable security policies, patches, authentication, authorization and other features using manual or non-automatic ways. For example, let's consider mobile vehicles of MANETs where we seek to protect each application of each device across the entire network, while a MANET is only one kind of access networks, wanting to meet security objectives in a non-intrusive way.

AI/ML/DL technologies can also be used for generation of security policies, patches, authentication, authorization and other features dynamically in real-time using centralized or distributive security architecture. With this, warfighter networks can use machine learning, neural network, and machine vision technologies. The difference is that warfighter networks can use different features and datasets of algorithms because of meeting different objectives in comparison to commercial networks, but can use the same common technology-agnostic architecture.

Warfighter networks can work with many diverse applications with the span of space-tier, airborne-tier, unmanned airborne vehicle (UAV)-tier, and ground (manned and unmanned)-tier along with MANETs, mobile cellular wireless networks, and fixed wireline networks. The network architecture 900 can be a high-level view of a multi-domain warfighter network architecture.

Military operations can be increasingly diverse in their nature. Individual applications like situational awareness (SA), command & control, battlefield assessment, embedded training, forward observer training, live warfare simulation, and others can benefit from one integrated picture containing the past history, current status, and potential consequences of actions in the warfare environment. So, these applications can have too much information to process. In one example, the condition of information overload occurs when one is unable to process the information presented into coherent SA. With the rapidly expanding ability to collect data in real-time/near real-time about many locations and providing data abstractions to the warfighter at different levels from the command and control center to individual field personnel, the danger of information overload can be significant.

A commander can benefit from an understanding of the global situational awareness and how the various teams are expected to move through an environment, whereas a private on patrol may only be concerned with a very limited area. Similarly, a medic may benefit from health records and a route to an injured soldier, whereas a forward observer may need a few days' worth of reconnaissance information in order to detect unusual or unexpected enemy actions. Ideally, the AI/ML/DL-based applications would be aware of these various tasks, the mission plans (e.g., including contingencies), and the current roles that any particular user may fulfil at a given time.

AI/ML/DL-based applications bridge two somewhat disparate fields. SA compels that the visual representations of data should be introduced. Similarly, other applications like sensors, robots, vehicles, computers, phones, servers, and other warfighter entities can use AI/ML/DL-based applications. AI can integrate a diverse amount of information from different applications including the outputs of ML/DL algorithms that can be considered AI algorithms in their own right. Consequently, it can limit the types of abstractions that make sense for a given application and push the application designer to create new methods of understanding perceptual or cognitive cues that go beyond typical human sensory experiences. The high-level abstractions, that are independent of programming languages used and supported dataset formats, facilitate for development of application programming interfaces (APIs) to draw on individual algorithms from different products or to compose multiple algorithms to solve complex tasks using AI/ML/DL.

Like SA, military applications can be complex. The traffic that can be generated by military applications can be as follows: Time series traffic from thousands of sensors in real-time, high continuous bit-rate (CBR) traffic in real-time of audio-video conferencing, highly busty application sharing traffic like map-display with geospatial information, traffic of live streaming videos from different sources of the battlefield, traffic of operations and management (O&M) information from network entities across the multi-domain network, location coordinates traffic of mobile and fixed entities fed by global positioning system (GPS) in real-time, and others. It simply exemplifies the fact that the AI/ML/DL should be used to process the information for fusion that provides the final actionable intelligence to the commanders' disposal in real-time.

Military applications can be AI/ML/DL-enabled as appropriate. The AI/ML/DL features and datasets of algorithms can be fundamentally different for different applications. For example, the SA application can employ specific features and datasets of individual sub-applications for using certain AI/ML/DL algorithms from the list of common algorithms while other applications may use the same and/or other algorithms from the said list of algorithms illustrated in the framework 910 although their individual feature-sets and datasets can be different.

Artificial intelligence/machine learning/deep learning itself can also subject to cyberattacks as adversaries are able to attack the training inputs or real-world input datasets in a way that can poison the training or actual inputs by AI/ML/DL-capable adversaries. Fortunately, proper defenses can be employed against these cyberattacks such as reactive and proactive defenses including increasing the hidden layers of neural networks. The AI/ML/DL algorithms can be robust enough against different kinds of adversarial attacks. The hardware and software of AI/ML/DL can keep the cybersecurity as a central tenant right from the beginning.

AI/ML/DL is a forerunner for reducing information overloads with superior performances for warfighters and others (e.g., commercial users). The situation for warfighters is unique because the enormous amount of information should be processed very fast for making the final decision in split-second time. Moreover, individual warfighter applications along with its AI/ML/DL infrastructure can be protected against cyberattacks. Most of the military applications are mission critical and should have faster response times of the order of few milliseconds to seconds. So, AI/ML/DL-enhanced military applications demand that the cybersecurity application are also be very fast if not the fastest. A huge amount of traffic that is generated by applications can be analyzed by a security application. In addition, the cybersecurity application can have its own computation-intensive algorithms that are processed in real-time. So, the cybersecurity application itself also can be enabled with AI/ML/DL-capability for reducing security information overloads for warfighters offering faster response time.

The cybersecurity application can be AI/ML/DL-enabled; in turn, the AI/ML/DL-enabled security application that correlates inputs from different sources making sense what is the actionable situational awareness for decision making in real-time. The security application augments the real-world scenarios for easy understanding and thereby reduces information overloads to warfighters. Military applications themselves can be AI/ML/DL-enabled because of the complexities of those applications for faster fusion of information.

Cybersecurity can be employed at various steps for individual logical entity of applications no matter where they are or where they belong to including the common AI/ML/DL infrastructure. Although the architecture framework 910 can be used for warfighter applications, the same architecture framework 910 can be applicable for commercial arena because the architecture is technology-agnostic. Explainable AI (XAI) and Causal Inference with Reflection (CI-R)-based ML/DL can be part of the AI/ML/DL technologies and will be addressed in the future.

The architecture framework 910 automates security controls of warfighter tactical networks and application assets, as well as provides rapid cybersecurity attack detection and response in different protocol layers: Physical layer, Link/Medium access control (MAC) layer, Network (e.g. Internet Protocol [IP]/Routing) layer, Transport layer, Middleware (e.g. OSs/VMs, AI/ML/DL) layer, and to Application layer (e.g. Warfighter Applications, Command & Control Applications). In addition, application programming interfaces (APIs) in the middleware and application layer can be included.

The architecture 900 and framework 910 can provide the reference guideline for robust degree of interoperability between different AI/ML/DL-based products to be used for automated cyber security. The API has the power to create high-level abstractions facilitating interoperability among different protocols, algorithms, and data formats locally if not over networks (over networks, standardized protocols are needed). Four example APIs that can be AI algorithms can include: Machine/Deep Learning (ML/DL) API, AI Application API, AI-aware Application Services API, and Cybersecurity Application (CA) API.

A ML/DL API, an algorithm itself, can be independent of other algorithms, products, services, programming languages, data formats for providing universal accessibility hiding implementation-specific details. The ML/DL API can work with a diverse range of problems and can be characterized as a predictor for making inferences about additional previously unseen instances when it is applied to a dataset of instances of some phenomenon of interest. The inference entities can be expressed as relations (e.g., datasets), attributes, learners, and predictors. Example problems that ML/DL can work with are classification, regression, ranking, dimensional reduction, collaborative filtering, and other functions.

A machine learning algorithm portion can include a neural network and their functionalities can be exposed to a common API addressing big data issues using distributive execution, separating algorithms and execution, reusable portions with compatible interfaces, and data elements and specifications for ML/DL API that allow output to be deployed in a vendor neutral environment for deployment ushering federated ML/DL solutions. The ML/DL API can enable sharing of resources distributed across a global network speeding up exploiting the dependency between parameters.

A limited degree of error tolerance of distributed AI/ML/DL programs can exist. This can allow for easy implementation of data-parallel and model-parallel algorithms (e.g., enabled by the API). For example, a parameter server that enables data-parallelism, by providing users with global read/write access to model parameters can be accessed by a client (e.g. AI/ML/DL worker as the first user 150 of FIG. 1) using a ML/DL API, thereby, it facilitates programmers to write data-parallel and model-parallel AI/ML/DL programs that exploit these principles, and can be scaled to big data and big model applications.

A goal of AI can be to understand the principles that make intelligent behavior possible in natural/artificial systems that can be embodied as automation computational agents (e.g., function similar to humans). The AI applications can act as the secondary controllers of AI agents of AI-ware applications. To serve this goal, an AI platform can encompass natural language processing (NLP), expert systems, vision, speech, and robotics, and other functional capabilities. These expert systems, vision, speech, and robotics, and others can use the same common ML/DL platform to meet their individual needs. Although NLP, expert systems, vision, speech, and robotics system, and others can have their own individual APIs, a singular AI API can be used in one embodiment. The singular AI API can work with the abstraction of the agent's representation of environments, behaviors/policies, planning system, knowledge base (KB), sensing/measurement, actions/decisions, value-function, and/or other features. The AI API can formalize queries corresponding to the various key aspects of intelligence of the automation computational agent for respective AI applications, organized so as to be independent of the algorithms. The singular AI API can support a limited but powerful set of functional abstractions in a manner with a simplicity of access to the AI functionalities that are desired by application developers and robustness of the software system in carrying out the specific functionalities directly access by the API bridging gaps between prototype research & development (R&D) and commercial/military AI applications.

AI-aware Application Services APIs can act as primary controllers of AI agents and can function as value-added specific services on the top of the AI applications shown at the upper-most layer of the framework 910. For example, NLP can be considered an AI application and can use ML/DL services to perform specific tasks such as automatic summarization, discourse analysis, machine translation, conference resolution, speech recognition, and other functions. However, a value-added AI-aware multimedia video-conferencing service using NLP when and how NLP sessions can to be used among the participants who speak with different languages. Although a high-level generalized AI-aware Application API, a set of value-added popular services can be combined to have a common API.

Included in the AI applications are cybersecurity applications, such as Tactical Public Key Infrastructure (TPKI), Authentication, Authorization, Accounting (AAA), and Access Control. These can be AI/ML/DL-aware. Intelligent cybersecurity applications can use a common AI/ML/DL platform for making them automatic acting like AI-based security agents augmented with NLP, expert system, and other functionalities that can use ML/DL technologies for detecting behavioral anomalies, stolen credentials, and malware; planting decoys and creating deterrence; and processing huge cybersecurity databases. A Cybersecurity Application (CA) API can be used as a common API by various cybersecurity applications and can be independent of their individual security services and algorithms.

An AI/ML/DL-based automated cybersecurity scheme can be applicable for individual OSI layers as shown in architecture 910. The cybersecurity agent residing in an individual layer of an individual functional entity (e.g. sensors, smart phones, computers, routers, servers, networks, and application software) can monitor traffic acting as client of the cybersecurity application. The individual cybersecurity agent in the individual layers can work in coordination with the AI/ML/DL-aware cybersecurity applications.

Four example AI algorithms that are AI APIs (ML/DL API, AI API, AI-aware Application Service API, and CA API) can be developed with in-built security mechanisms directly in API packages, classes, and methods. One type of cyber attack restores the attack in System API calls. The System API calls can be analyzed employing AI/ML/DL algorithms employ pre-processing, feature extraction, and classifier mechanisms to detect malware/ransomware.

ML/DL-based algorithms can be augmented with preventive adversarial cybersecurity algorithms (that can also be AI algorithms) to prevent cyberattacks. The ML/DL-based middleware platform can be a place of residence while application control logic can be a part of the cybersecurity application platform (e.g. AI/ML/DL-aware Automated Applications, Decision Making Tools).

Products in the transport, network, link/MAC, and Physical (PHY) layer used in warfighter networks can be implemented in accordance with the framework 910. Also, individual OSI layers can use AI/ML/DL technologies for processing of respective functional features in individual layers. If AI/ML/DL is used as the common infrastructure depicted in the framework 910 in applications, then it can provide huge benefits for interoperability creating a common AI/ML/DL standard. Similarly, the common standards for AI/ML/DL-aware signaling protocols using different algorithms specific to each application (e.g. cybersecurity, SA, Command & Control, Network Management]) can be developed fostering interoperability to include upper application infrastructure. Even if these AI/ML/DL infrastructure and AI/ML/DL-aware application-signaling protocols are standardized by the standard fora, still value-added applications can be built on the top of these standards. The architecture 900 and/or framework 910 can create interoperability for the core software and hardware infrastructure removing duplication of the same thing as well as offering economies-of-scale for developing cheaper AI/ML/DL-enabled cybersecurity, and other application products.

Cybersecurity, operations & management (O&M), and AI/ML/DL capabilities can be applicable for individual OSI layers, but their control logic can reside in an upper application layer of their respective applications. The framework 910 can be used for the centralized client-server (C/S)-based communications application architecture. Wireless and wireline networks can operate using C/S applications architecture as well as with AI/ML/DL-based architecture framework for the distributive peer-to-peer (P2P) applications (e.g., where each peer acts as equal independent peer behaving both as client and server as appropriate). In one example, an MANET is a P2P network where an individual node acts as an independent peer joining and leaving the network at-will and can communicate with each other using P2P applications. Mobile devices (e.g., smart phones) can be equipped with AI/ML/DL-based chipsets. P2P applications can also operate in C/S-mode as a subset of its capabilities. Aspects disclosed herein can be used in wired or wireless networks, as well as with hybrid C/S and P2P communications architecture.

AI/ML/DL can be beneficial for warfighter applications for reducing information overloads. Moreover, the cybersecurity application itself can be AI/ML/DL-enabled. This is because AI/MI/DL has the potential for summing up of various real-world information received from multiple sources in real-time and pointing to essential information beneficial for decision making at once to warfighters. Automated AI/ML/DL-based technologies can be employed in warfighter networks for multi-domain (e.g., terrestrial, airborne, and space) operations including cybersecurity.

The architecture 900 and framework 910 can facilitate interoperability and reduce the application development cost by using the same common AI/ML/DL infrastructure as the fundamental basis for development of secure high-performance applications. To meet application goals, suitable algorithms can be developed as appropriate. An individual application can have its own set of feature-sets and datasets of the algorithms listed in the common AI/ML/DL middleware platform to meet its own specific goals.

What is claimed is:
1. A system comprising:
   a first access component configured to grant a first user access to a first artificial intelligence algorithm from an artificial intelligence algorithm repository and a second access component configured to grant a second user access to the first artificial intelligence algorithm from the artificial intelligence algorithm repository, where the first user is different from the second user, where the artificial intelligence algorithm repository comprises the first artificial intelligence algorithm and a second artificial intelligence algorithm, where the first artificial intelligence algorithm is different from second artificial intelligence algorithm, where the first artificial intelligence algorithm comprises a modifiable parameter set, where the first access component is configured to grant the first user access to modify the modifiable parameter set in a first manner, where the second access component is configured to grant the second user access to modify the modifiable parameter set in a second manner, where the first manner and the second manner are different, and where the first access component, the second access component, or a combination thereof is implemented, at least in part, by way of non-software.

2. A system comprising:

a first access component configured to grant a first user access to a first artificial intelligence algorithm from an artificial intelligence algorithm repository and a second access component configured to grant a second user access to the first artificial intelligence algorithm from the artificial intelligence algorithm repository, where the first user is different from the second user, where the artificial intelligence algorithm repository comprises the first artificial intelligence algorithm and a second artificial intelligence algorithm, where the first artificial intelligence algorithm is different from second artificial intelligence algorithm, where the first access component is configured to grant the first user access to the second artificial intelligence algorithm from the artificial intelligence algorithm repository concurrent with the access to the first artificial intelligence algorithm and where the second access component configured to grant a second user access to the first artificial intelligence algorithm from the artificial intelligence algorithm repository without concurrent access to the second artificial intelligence algorithm, and where the first access component, the second access component, or a combination thereof is implemented, at least in part, by way of non-software.

3. The system of claim 2,
where the first artificial intelligence algorithm is a machine learning algorithm.

4. The system of claim 2,
where the first artificial intelligence algorithm is a deep learning algorithm.

5. The system of claim 2,
where the first artificial intelligence algorithm is a cybersecurity algorithm.

6. The system of claim 2,
where the first artificial intelligence algorithm is a neural network platform layer algorithm.

7. The system of claim 2,
where the first artificial intelligence algorithm is an applications layer algorithm.

8. The system of claim 2,
where the first artificial intelligence algorithm is an expandable artificial intelligence algorithm.

9. The system of claim 2,
where the first artificial intelligence algorithm is a casual interface with reflection algorithm.

10. A system, comprising:

a repository configured to retain a first artificial intelligence algorithm and a second artificial intelligence algorithm and an access portal configured to grant access to multiple users to the first artificial intelligence algorithm and the second artificial intelligence algorithm, where the first artificial intelligence algorithm comprises a modifiable parameter set, where the access component is configured to grant a first user of the multiple users access to modify the modifiable parameter set in a first manner, where the access component is configured to grant a second user of the multiple users access to modify the modifiable parameter set in a second manner, where the first manner and the second manner are different, and where the access portal is configured to grant access to multiple users to the first artificial intelligence algorithm and the second artificial intelligence algorithm concurrently.

11. The system of claim 10,
where the first artificial intelligence algorithm is a machine learning algorithm.

12. The system of claim 10,
where the first artificial intelligence algorithm is a deep learning algorithm.

13. The system of claim 10,
where the first artificial intelligence algorithm is a cybersecurity algorithm.

14. The system of claim 10,
where the first artificial intelligence algorithm is a neural network platform layer algorithm.

15. The system of claim 10,
where the first artificial intelligence algorithm is an applications layer algorithm.

16. The system of claim 10,
where the first artificial intelligence algorithm is an expandable artificial intelligence algorithm.

17. The system of claim 10,
where the first artificial intelligence algorithm is a casual interface with reflection algorithm.

18. A system, comprising:

a first access component configured to grant a first user remote access to a first artificial intelligence algorithm from an artificial intelligence algorithm repository and a second access component configured to grant a second user remote access to the first artificial intelligence algorithm from the artificial intelligence algorithm repository, where the first user is different from the second user, where the artificial intelligence algorithm repository comprises the first artificial intelligence algorithm and a second artificial intelligence algorithm, where the first artificial intelligence algorithm is different from second artificial intelligence algorithm, where the first artificial intelligence algorithm comprises a modifiable parameter set, where the first access component is configured to grant the first user access to modify the modifiable parameter set in a first manner, where the second access component is configured to grant the second user access to modify the modifiable parameter set in a second manner, where the first manner and the second manner are different, where the first artificial intelligence algorithm is a neural network platform algorithm/application layer algorithm, and where the first access component, the second access component, or a combination thereof is implemented, at least in part, by way of hardware.

\* \* \* \* \*